United States Patent [19]

Kalinowski

[11] 4,333,113
[45] Jun. 1, 1982

[54] METHOD AND APPARATUS FOR MONITORING THE REPRODUCTION OF RECORDED INFORMATION

[75] Inventor: Richard Kalinowski, Brest, France

[73] Assignee: Quadrivium Techniques Avancees, Paris, France

[21] Appl. No.: 160,007

[22] Filed: Jun. 16, 1980

[30] Foreign Application Priority Data

Jun. 18, 1979 [FR] France ................ 79 15535

[51] Int. Cl.³ .................................................. G11B 5/02
[52] U.S. Cl. ............................................. 360/27; 360/18
[58] Field of Search ............................ 360/20, 27, 18

[56] References Cited

U.S. PATENT DOCUMENTS

| | | | |
|---|---|---|---|
| 2,807,797 | 9/1957 | Shoemaker | 360/20 |
| 3,171,902 | 3/1965 | Jones et al. | 360/27 |
| 3,188,615 | 6/1965 | Wilcox, Jr. | 360/20 |
| 4,086,634 | 4/1978 | Cook | 360/27 |
| 4,188,646 | 2/1980 | Sordello et al. | 360/48 |

Primary Examiner—Vincent P. Canney
Attorney, Agent, or Firm—Bucknam and Archer

[57] ABSTRACT

The present invention relates to a method and device for associating auxiliary information with principal information, and to a device for monitoring the reproduction of principal information recorded on a track, whereby the auxiliary information is coded in an auxiliary signal of limited frequency and superposed on the principal signal, to be recorded in said track. The device comprises a detection circuit connected at the output of the reader head to detect an auxiliary signal associated with the principal information and occupying a limited range of frequencies and a recording device for recording the auxiliary information. The invention is more particularly applied to the monitoring of the public reproduction of recordings.

10 Claims, 3 Drawing Figures

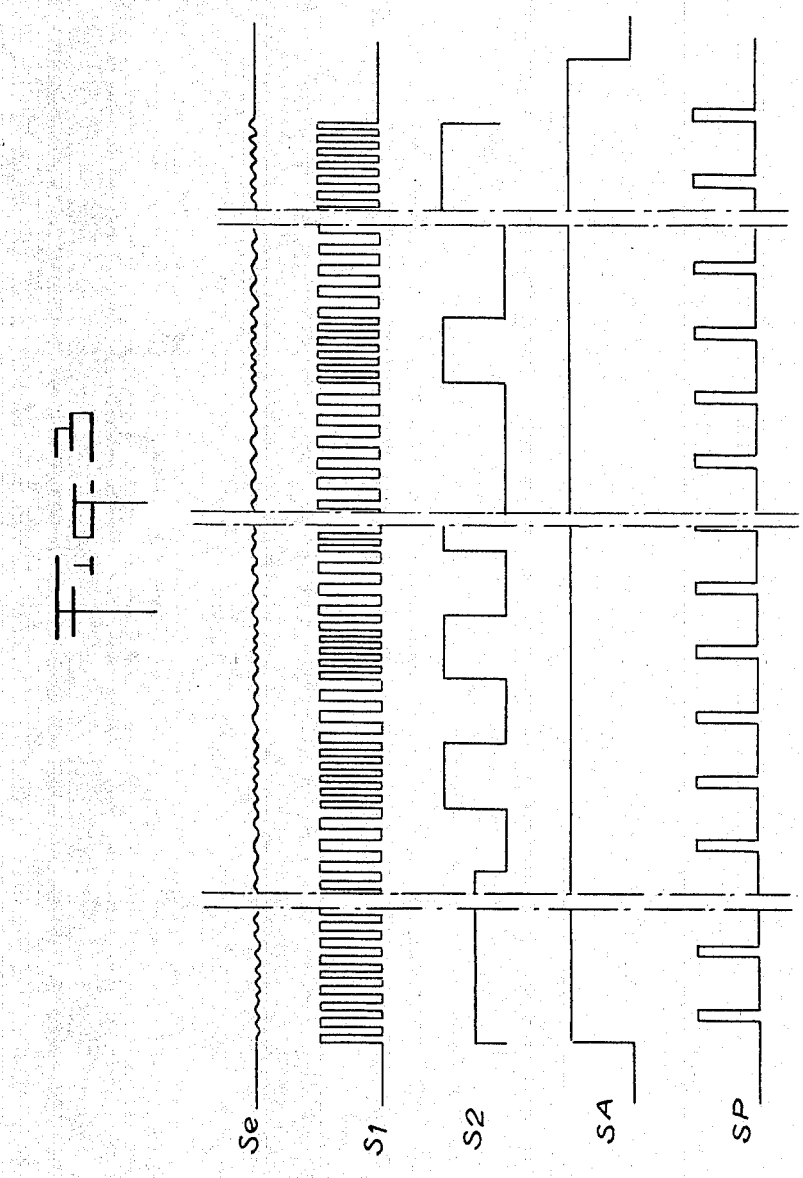

METHOD AND APPARATUS FOR MONITORING THE REPRODUCTION OF RECORDED INFORMATION

The present invention relates to a process for associating auxiliary information with principal information, particularly sound, visual or audiovisual information, recorded on at least one track of an information medium.

The auxiliary information is intended to allow functions other than the simple reproduction of the principal information to be performed, when reading the recorded information. Among these functions, mention may be made for example of the remote control of luminous or mobile devices when recorded music is reproduced. However, the application more particularly contemplated by the present invention is the monitoring of the reproduction of recorded sound, visual or audiovisual information.

At the present time, it is very difficult to precisely monitor the reproduction, in public or other places, of sound or audiovisual recordings, for example musical works and songs. Now, this monitoring serves to take account of the works subject to royalties, particularly for the distribution of copyright.

One of the object of the invention is therefore to provide means for strictly monitoring the reproductions of recordings in order to make it easier to take into account and manage the monitoring information collected.

It is generally an object of the invention to associate auxiliary information with the principal information recorded on at least one track of an information medium and adapted to be read by means of a reader device converting the information read into a read-out signal.

This object is attained by a method whereby, according to the invention, the auxiliary information is coded in an auxiliary signal located in a limited range of frequencies and superposed on the principal signal, to be recorded in at least one zone of said track.

If the principal recorded information is, for example, sound information, an auxiliary signal is used which is at a frequency outside the spectrum of audible frequencies, but which may be perfectly well taken into account upon reproduction by the reader device. In the course of reproduction, the auxiliary signal does not interfere with the principal signal. By way of additional precaution, when the principal signal is recorded on the information medium with an amplitude lower than a determined threshold for a given frequency, the auxiliary signal is given an amplitude whose level is lower by several tens of dB than that of said determined threshold at the frequency of the auxiliary signal.

As indicated hereinabove, a more particular object of the invention is a method for monitoring the reproduction of a recording, particularly for taking into account works subject to royalties.

In accordance with the invention, in the course of reading the recording, the presence of at least one auxiliary signal is detected in the read-out signal, said auxiliary signal representing in coded form auxiliary information associated with the recording reproduced and located in a limited range of frequencies and the auxiliary information is recorded further to this detection.

It suffices that the auxiliary information contain the identification of the work recorded and of its author for the above-defined process to automatically take into account all the recordings reproduced by the same reader device. Upon each detection of a new auxiliary signal, the corresponding auxiliary information may be stored on an information medium associated with the reader device and advantageously allowing the subsequent exploitation of the auxiliary information collected without human intervention.

The invention will be more readily understood on reading the following description with reference to the accompanying drawings, in which:

FIG. 3 is a diagram of signals illustrating the detection and decoding of the auxiliary information.

Figures 1, 2:
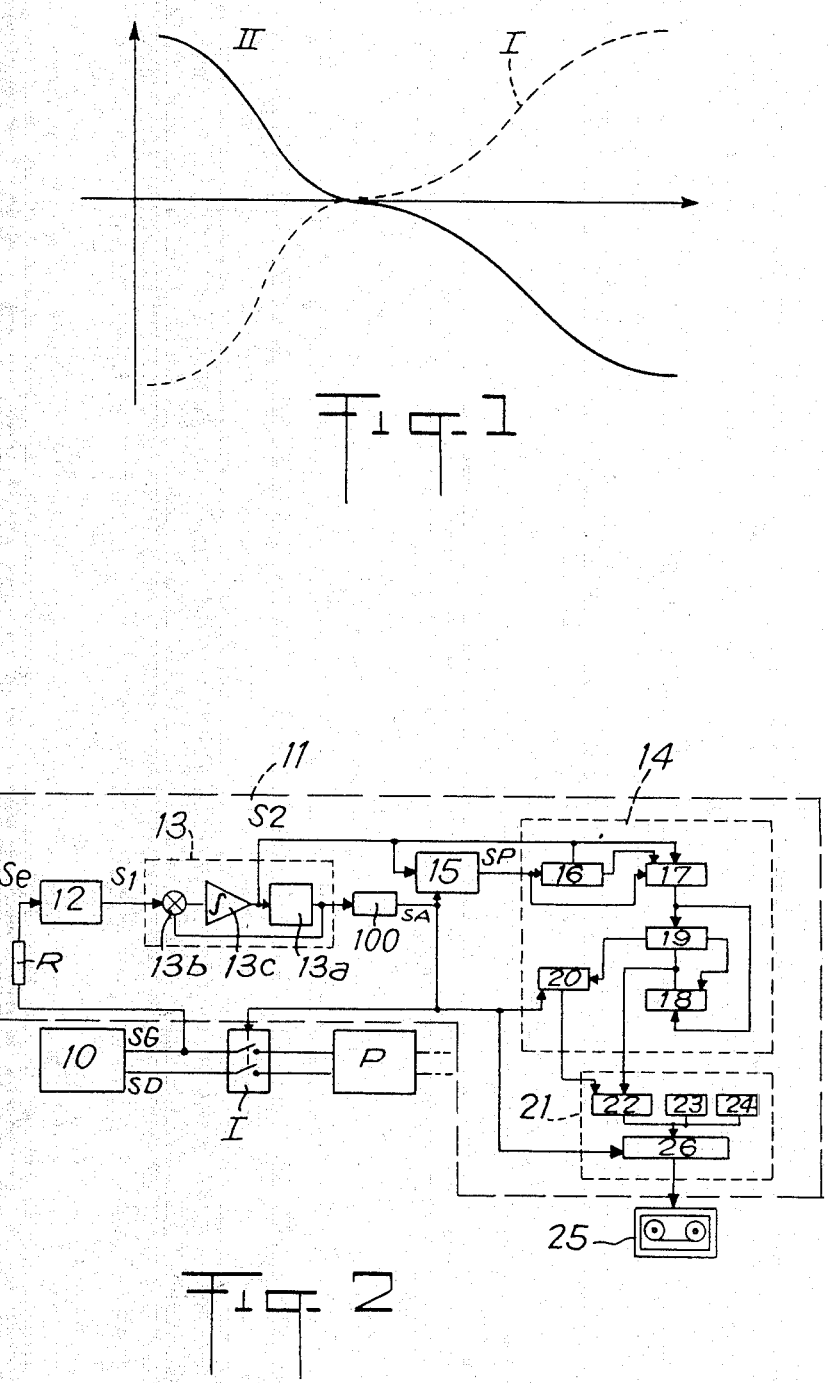
FIG. 1 illustrates the recording level correction and signal reproduction curves as a function of the frequency.
FIG. 2 is a general diagram of a device for monitoring the reproduction of recordings, in accordance with the invention.

In the following specification, the monitoring of the reproduction of sound recordings (music, songs, . . .) on discs or magnetic tapes will be dealt with by way of example, the recorded information being converted into an electric read-out signal by means of a reading head adapted to the nature of the recording medium.

It is obvious, however, that the invention is also applicable to the case of recording visual or audiovisual information, and to recording media of different natures, for example optical reader discs. In addition, although the domain more particularly envisaged by the invention is that of monitoring the reproduction of recordings, other applications may be envisaged in which the auxiliary information associated with the principal information serves for purposes other than monitoring.

As it is question of monitoring the reproduction of sound recordings, auxiliary information is associated with the principal sound information recorded, which contains the identification of the work recorded and its author, with a view to subsequently accounting the works subject to royalties and diffused or heard in public and other places.

The process according to the invention generally consists in coding the auxiliary information in the form of an auxiliary signal which is superposed on the principal signal during recording but which is located in a limited frequency range outside the spectrum of audible frequencies towards the ultrasounds (for example beyond 15 kHz).

The auxiliary signal, although not audible to man, is detected upon read-out, this enabling the auxiliary information to be recognized and decoded before being stored, possibly with other information such as, for example, the date, time, place and number of times the recording was reproduced.

It should be noted that the auxiliary signal is recorded on the same track as the principal signal according to the process of recording particular to each medium: sound-recording for discs, magnetic recordings for magnetic tapes on reels or cassettes. Thus, in the case of re-reading for recording on a different medium, the auxiliary signal is not lost and will always be detectable.

Several possibilities are offered for coding the auxiliary information with a view to producing the auxiliary signal. To this end, the known techniques of transmitting digital or analog information may be called upon, employing known processes of coding and modulation.

The auxiliary signal may for example be a "portion" of information of relatively short duration, about 5 to 10 seconds, constituted in a plurality of periods, as follows.

A first period is formed by a signal of fixed frequency Fo located in the range of inaudible frequencies, for example between 16 to 20 kHz.

A second period contains a modulation of the frequency Fo at a digital bit synchronization rhythm (primary synchronization). Modulation is for example of the FSK type ("Frequency Shift Keying"), the frequency of the modulated signal taking the value Fo+$\Delta$F or Fo−$\Delta$F according to the value of the binary information. $\Delta$F is for example equal to a few hundreds of Hz.

A third period contains a coded, so-called format synchronization word which is common to the recordings of the same type and which is used to determine the instant from which the message constituting the auxiliary information proper begins exactly (secondary synchronization).

The fourth and last period contains this message particularizing the recording with which it is associated. This message may for example comprise the elements for identifying the place where this recording was made, the date of recording, the order number on this date, the recording laboratory, title of the work, name of the author of the work, . . .

The auxiliary signal is advantageously repeated all through the recording so that it is taken into account even if only part of the recording is reproduced. In addition, when the sound recording is made on several tracks, the same auxiliary signal is recorded at least in one zone and preferably repeated all along each track (case of stereophony).

The auxiliary signal is superposed on the principal signal then the whole is recorded on the recording medium.

The level of the auxiliary signal is preferably chosen to be much lower than that of the principal signal.

Referring now to the drawings, FIG. 1 illustrates the curves showing the level corrections currently made to the recording (curve I) and to reading (curve II), as a function of the frequency, the sum giving a level independent of the frequency.

The auxiliary signal is advantageously recorded at a level lower by several tens of dB than that of the maximum recording level for the frequency of the auxiliary signal, for example at −40 dB from this maximum threshold. From FIG. 1, it will be noted that this represents, after correction, a level located at −80 dB below the maximum level of towards the low frequencies. The auxiliary signal is then not only in the range of inaudible frequencies, but also at a level imperceptible to a listener.

FIG. 2 schematically illustrates a device for detecting the presence of an auxiliary signal as defined hereinabove, superposed on a principal signal in the read-out signals furnished by a reading head 10 (for example stereophonic) passing over two tracks of a recording medium (not shown).

The read-out signals SG and SD (left-hand and right-hand channels) are applied, on the one hand, to the input of a preamplification circuit P of a conventional reproduction device (not shown) and, on the other hand, to the input of a detection circuit 11 connected in shunt to the output of the reading head.

The detection circuit comprises a filtering and re-shaping circuit 12 receiving at least one of the signals SG and SD (signal Se in FIG. 3) via a high value resistor R so as not to disturb the connection between the reading head and the reproduction circuits. The circuit 12 may be constituted by a phase loop whose controlled oscillator furnishes at the output a signal at a frequency which may vary on either side of the frequency Fo with a limited excursion. The auxiliary signal is amplified and re-shaped (signal S1 in FIG. 3).

The width of the pass band of the circuit 12 is chosen as a function of the band width occupied by the modulation and of the possible variations in the readout speed (at maximum about 5% on either side of the nominal speed).

A demodulator circuit 13 is connected to the output of the circuit 12 in order, on the one hand, to furnish the logic decoding circuit 14 with a demodulated digital signal (S2 of FIG. 3) and, on the other hand, to control a bit synchronization signal generator 15 (primary synchronization signal SP in FIG. 3).

To form the demodulator 13, a phase loop centred on Fo may be used, comprising an oscillator 13a controlled by voltage, a phase comparator 13b receiving the signal S1 and the output signal of the oscillator 13a, and an integrator amplifier 13c receiving the error signal furnished by the comparator 13b and controlling the oscillator 13a. The signal S2 is taken at the output of the amplifier 13c, each sign change of this output corresponding to a passage of the frequency Fo+$\Delta$F to Fo−$\Delta$F or vice versa.

The output signal of the oscillator 13a indicates the synchronization of the demodulators 13. This synchronization signal initiates the functioning of the generator 15; then the signal S2 is preponderant for the synchronization of bits. The synchronization signal is converted into a D.C. signal SA (FIG. 3) or authorization signal which returns to zero a determined period of time after the last pulse emitted by the oscillator 13a, via a retrippable monostable circuit 100.

This logic circuit 14 comprises a format recognition circuit 16 loaded by the decoded bits of the signal S2 at the rhythm of signal SP. When the configuration corresponding to the coded format synchronization word is recognized in the circuit 16 (secondary synchronization), the latter authorizes the load of the following bits in a register 17.

The contents of the register 17 are compared with the contents of a register 18 by means of a comparator 19 which, in the case of equality, increments a counter 20 by one unit and, in the case of inequality, controls the transfer in the register 18 of the contents of register 17.

When, as a safety precaution, the counter 20 has counted a predetermined number of equalities, the contents of the register 18, i.e. the auxiliary information associated with the recording heard, are transferred in a register 22 of an interface circuit 21. The interface circuit 21 further contains registers 23 where other information is stored, for example relating to the time and place where the reproduction under way is made.

The transfer onto a magnetic cassette tape 25 of the contents of registers 22, 23, 24 via the switch member 26 is controlled by the trailing edge of the signal SA signalling the end of the reproduction. The counter 20 is returned to zero.

The detection circuit 11 is ready for detecting and transferring new auxiliary information, or possibly the same if the same recording is heard again.

The auxiliary signal is repeated all along the or each track where the principal sound information is recorded, the signal SA is advantageously used as signal controlling closure of a switch I connected to the input of the preamplifier P. Thus, a recording can only be heard if the auxiliary signal is detected.

Various modifications or additions may of course be made to the embodiment described hereinabove of a process and device according to the invention, without departing from the scope of protection as defined by the accompanying claims.

In particular, other known techniques may be used, on the one hand for coding the auxiliary information and, on the other hand, for detecting, decoding and transferring this information.

What is claimed is:

1. A method for monitoring the reproduction of an audio information recorded on at least one track of a first recording medium, comprising the steps of recording in superimposition on said at least one track of said first recording medium an audio information signal and an auxiliary information signal, said auxiliary information signal being a coded digital signal derived from a pilot frequency in a limited frequency range outside the spectrum of audible frequencies towards the ultrasounds; detecting, in the course of reading the information recorded on said at least one track, the presence of at least one auxiliary information signal representing, in coded form, auxiliary information associated with the principal audio information; separating said auxiliary information signal from said audio information signal; and rerecording said separated auxiliary information signal on a second recording medium.

2. The method of claim 1, wherein said auxiliary information signal is recorded on the first recording medium with an amplitude whose level is lower by at least 20 db than that of the maximum level of the recorded audio information signal.

3. The method of claim 1, wherein the auxiliary information signal comprises a first period formed by a signal of fixed frequency located in the range of inaudible frequencies, a second period of primary synchronization defining a digital bit synchronization rhythm, a third period of secondary synchronization containing a coded format synchronization word and a fourth period containing a coded message specifying the auxiliary information.

4. The method of claim 1, wherein the auxiliary signal is repeated throughout along said track of the first recording medium.

5. A method for monitoring the reproduction of a principal audio information recorded on at least one track of a recording medium, wherein the information recorded on said recording medium is converted into a read-out signal by means of a reader device and said principal audio information is reproduced by processing the read-out signal, said method comprising the steps of filtering in shunt in the course of reading the information recorded on said track, the read-out signal to extract therefrom the components in a predetermined limited range of frequencies outside the spectrum of audible frequencies towards the ultra sounds, detecting the presence of at least one auxiliary signal representing, in coded form, auxiliary information associated with the principal audio information, decoding said detected auxiliary signal, and displaying said auxiliary information on an autonomous information medium.

6. A reproduction device for monitoring the reproduction of a principal audio information recorded on at least one track of a recording medium, said device comprising a head for reading the information recorded on said track and a reproduction circuit connected at the output of the reading head to reproduce said principal audio information from the read-out signal furnished by the reading head, the improvement comprising detecting means for detecting the presence in the recorded signal of a superimposed digital auxiliary information signal coded by derivation from a pilot frequency in a predetermined limited frequency range outside the spectrum of audible frequencies towards the ultra sounds, said detecting means being connected to said reading head through a pass band filter centered on said pilot frequency and comprising a demodulation circuit to produce a demodulated digital output signal; a primary synchronization signal generator activated by said demodulated digital output signal; a format recognition circuit piloted by the primary synchronization signal outputted by said primary synchronization signal generator, and memory means for storing said demodulated digital output signal.

7. The device of claim 6, wherein said detecting means comprises a voltage controlled oscillator, and a phase locked loop centered on said pilot frequency.

8. The device of claim 6, wherein said memory means comprises at least a buffer register loaded with the demodulated digital output signal and a peripheral storage means receiving the content of said buffer register.

9. The device of claim 8, wherein said memory means comprises a first and a second buffer register, a comparator connected between said first and second buffer register, first transfer means connected between said first and second buffer registers and second transfer means connected between said second buffer register and said peripheral storage means, said comparator activating said peripheral storage means, said comparator activating said first transfer means responsive to an inequality in the contents of said first and second buffer registers and said comparator activating said second transfer means responsive to an equality in the contents of said first and second buffer registers.

10. The device of claim 9, wherein a digital counter is connected between said comparator and said second transfer means, and said comparator enabling said second transfer means responsive to a sequence of a predetermined number of equalities of contents of said first and second buffer registers.

* * * * *